United States Patent [19]

Heck

[11] 4,117,580
[45] Oct. 3, 1978

[54] MANUFACTURE OF BEARINGS

[76] Inventor: Friedrich Heck, Baingser Weg 47, Deilinghofen, Fed. Rep. of Germany

[21] Appl. No.: 769,652

[22] Filed: Feb. 17, 1977

Related U.S. Application Data

[63] Continuation of Ser. No. 565,618, Apr. 7, 1975, abandoned.

[51] Int. Cl.² .......................................... B21D 53/10
[52] U.S. Cl. .................................. 29/149.5; 164/100; 164/102; 164/114; 164/DIG. 2; 164/DIG. 3; 29/149.5 PM; 29/DIG. 6; 29/149.5 R
[58] Field of Search ............... 29/149.5 R, 149.5 PM, 29/2, 8, 149.5 C; 164/114, 100, 106, 101, 102

[56] References Cited

U.S. PATENT DOCUMENTS

| | | | |
|---|---|---|---|
| 1,920,022 | 7/1933 | Six | 29/149.5 R |
| 1,923,075 | 8/1933 | Brown | 29/149.5 R |
| 2,109,890 | 3/1938 | Pattison et al. | 29/149.5 R |
| 2,390,160 | 12/1945 | Marvin | 164/114 X |
| 2,679,079 | 5/1954 | Lyons | 29/149.5 R |
| 2,936,505 | 5/1960 | Witucki et al. | 164/114 X |
| 3,118,272 | 1/1964 | Clapp | 29/149.5 PM |
| 3,500,526 | 3/1970 | Taft | 29/149.5 R |
| 3,812,563 | 11/1972 | Toaz | 29/149.5 PM |

Primary Examiner—C.W. Lanham
Assistant Examiner—V. K. Rising
Attorney, Agent, or Firm—Brisebois & Kruger

[57] ABSTRACT

A lined bearing is made by tinning at least the radially inner surface of a bearing ring, providing an atmosphere of water vapour adjacent the tinned surface to which a flux is also supplied, and centrifugally casting on the lining material. Tinning can be achieved by applying a slurry of tin powder in a flux solution, e.g. an aqueous zinc chloride solution, followed by heating at least to a tinning temperature. Further flux solution can be sprayed onto the hot tinned surface in the centrifugal casting machine to form the desired atmosphere and to disperse the flux as fine particles. Quenching by spraying on cold water preferably commences immediately after casting of the white metal or other lining material begins.

23 Claims, 4 Drawing Figures

MANUFACTURE OF BEARINGS

This is a continuation of application Ser. No. 565,618, filed Apr. 7, 1975, now abandoned.

This invention relates to the manufacture of a bearing of the type having a lining of bearing material, usually white metal, attached to a bearing shell.

Large bearings, such as the journal bearings employed in rolling mills for supporting the roll necks, are usually made by dipping the bearing shells in a tin bath, and then centrifugally casting the linings on to the internal surfaces of the shells. That technique is expensive both in labour and materials.

In one well-known process, the bearing rings whose inside walls are to be coated with white metal (babbit metal) are cleaned, for example, by degreasing, pickling and scouring. A flux is then applied to the cleaned metal surface. The cleaned and flux-wetted bearing rings are then immersed in a liquid tin bath in which the clean surfaces are wetted with tin. The steel rings are generally left in the bath for a time. After the temperature has been equalised the ring is removed from the bath and surplus tin is allowed to drain therefrom. There remains a comparatively thin layer of tin on the surface of the ring. A ring prepared in this way can then be lined with white metal in a centrifugal casting apparatus.

It has been found that in time a layer of dross forms on the surface of the molten tin bath and that articles dipped in the bath pick up dross as they are removed from the bath. This dross on the tinned article impairs the bond with the subsequently applied white meta. There is also a tendency for a tin oxide layer to form on the surface of this tin coating whilst the excess tin is being drained off. In practice, therefore, it is common to wipe the molten layer of tin on the surface of the ring with asbestos or some other heat resistant material to remove the dross and any tin oxide layer before applying white metal. This treatment is however extremely difficult to carry out on rough or grooved radially inner surfaces.

An additional disadvantage of the tin bath dipping method is that with large bearing rings of up to 90 inches diameter the tin bath represents a considerable capital investment amounting to some thousands of pounds sterling and that in time and with use the tin bath becomes contaminated with impurities with the result that the tin of the bath has to be purified.

Furthermore, it is a consequence of the tin bath method that all surfaces of the bearing ring must be coated with tin which is wasteful of tin. Furthermore, it is not possible to control the thickness of the tin coating.

In practice bearing rings coated using usual methods are often found to have insufficient adhesion between the steel ring and the white metal lining. Reduced load bearing capacity or even failure of the bearing is the result.

The present invention accordingly seeks to provide a method of lining bearings which obviates the use of an expensive molten tin bath.

The invention additionally seeks to provide a process in which any tin oxide layer formed is efficiently removed prior to casting on the lining material.

According to the present invention a method of making a lined bearing comprises applying a layer of metallic bonding material to at least the radially inner surface of a bearing ring and casting on a layer of lining material initially at least in the presence of water vapour and of a flux.

Preferably, prior to casting on the layer of lining material the bearing ring is preheated at least to the melting point of the bonding material. In this preferred method a mixture of water and flux is preferably sprayed on to the preheated bearing ring. Thus a solution of zinc chloride in water having a specific gravity of about 2 may be sprayed on to the preheated bearing ring.

The step of casting on the layer of lining material may be effected in a centrifugal casting machine. Preferably also the method includes the step of spraying water on the radially external surface of the ring immediately after commencing the casting of lining material in order to quench the ring. Preferably the flux is a halogen-containing flux, more preferably a chlorine-containing flux. Typical fluxes include stannous and stannic chlorides, lead chloride, antimony trichloride, antimony oxychlorides, zinc chloride, ammonium chloride and mixtures of two or more thereof.

If desired, a gaseous halogen, for example gaseous chlorine, may be introduced into the casting zone prior to pouring in the molten lining material.

The bonding material will usually be tin or a tin alloy, for example a tin-cadmium alloy. It can be any bonding material known to be suitable for bonding a lining material to the bearing ring to form a lined bearing. The bonding material is preferably applied to the inner surface of the bearing ring in the form of a powder, optionally in admixture with a flux. Conveniently the bonding material powder, for example, tin powder, is mixed with a flux and with water to form a slurry. The flux can be any of those materials described above. Such a slurry may be applied to the inner surface of the bearing ring in any convenient manner, for example by brushing, or spraying.

One or more additives such as a thixotropic additive, an acid such as hydrochloric acid, or other pH control additive, or a low boiling organic solvent such as ethanol or acetone may be incorporated in the slurry. The slurry may be applied to the surface of the ring at room temperature or the ring may be preheated prior to application of the bonding material power/flux slurry.

The bonding material powder-flux mixture may further include metal particles which are insoluble in and have a greater specific gravity than molten tin, for example particles of carbonyl nickel, that is to say finely divided nickel that has been produced via nickel carbonyl and has a specific gravity of 0.6–0.8 grams/cm$^3$. Such metal particles may constitute up to 3% by weight (for example 1.5 to 2% by weight) of the bonding material. This technique helps to avoid any uneven distribution of the film of tin caused by even minor errors in centering during rotation of the bearing ring (which has been heated to above the melting point of the tin) in the centrifugal casting machine. The molten tin collects at the points furthest away from the axis of rotation. This can lead to poor, very thin layers of tin film which impair the bonding with the white metal. The insoluble foreign metal powder particles bind the liquid tin to themselves and prevent it to a large extent from draining away from the steel surface when great centrifugal forces are in play. The carbonyl nickel is preferably applied evenly over the surface of the steel.

In one technique a first layer of flux solution with a concentration of about 1.8–1.9 g/cm$^3$ is applied to the radially inner surface of the bearing ring and then a tin powder or tin powder-carbonyl nickel powder mixture is added. Particularly thixotropic fluxes have been shown to be favourable towards the forming of uniformly thick flux films to which the tin powder or tin powder-carbonyl nickel mixture can be added.

The addition of the tin powder to the flux layer has the advantage that the powder layer adheres relatively strongly to the surface of the steel because of the flux. During the heating process the flux acts as a reducing agent on the surfacce of the steel and also on the surface of the tin powder and a thin primary tin layer is produced on the chemically activated surface of the steel before the tin begins to melt properly. The molten tin rapidly spreads out over this layer. It remains stuck to the point where it makes contact both during heating and also in its molten form. The added fine carbonyl nickel particles hold the liquid tin in place and prevent the film of tin flowing freely. By adding foreign metal particles it is possible to prevent tin films with several thicknesses from draining away. The capillary and adhesive powers of the carbonyl nickel bind the tin to the surface of the steel during the centrifugal process even if the bearing ring has been set up off-centre for pouring in the white metal.

It has been shown that the adhesion between the bearing metal and the surface of the steel can be considerably improved by using these methods so that the strength of the bond is increased almost to the ultimate strength of the bearing metal.

A further advantage of the use of carbonyl nickel is the fact that the greater specific gravity of the particles vis-a-vis the tin and the bearing metal which is itself rich in tin (babbit) causes the particles to be forced on to the surface of the steel by the centrifugal forces and they are not able to swim around on their own.

As the powder applied in this way soaks up the flux the surface is left relatively dry. The film of flux then sprayed on them improves the reduction of the metal oxides without the flux beginning to flow or the metal particles possibly floating away.

Application of the bonding material can be effected in the presence of small iron articles having, for example a maximum diameter of from 2 to 10 mm, for example steel nuts, steel screws or rivets. Treatment of the bearing ring with such granulated material can take place either at room temperature or while the bearing ring is being heated to the tinning temperature. By rotation of the bearing ring about its axis the granulated material can be made to rub against the radially inner surface of the ring before and while the bonding material is melting and thereby help to activate the surface of the ring. At the same time the granulated material also helps to equalise the temperature inside the ring by removing localised spots of overheating and by transferring heat to the parts of the ring which have been heated less. Once tinning is complete the granulated material is taken out and cooled, for example, by plunging into cold water ready for re-use.

The slow rolling movement of the granulated material as the ring is rotated about a horizontal axis helps to provide a uniform distribution of all the constituents. Preferably sufficient granulated material to provide a surface area about 3 to about 10 times the surface area of the radially inner surface of the bearing ring is used. This technique can replace the well-known wire brush treatment.

The advantage of effecting tinning and coating with the bearing material in a single "heat" without any intermediate cooling stage shortens the process time as well as conserving energy and avoiding contamination of the layer of tin bonding material on the inner surface of the bearing ring.

In one convenient form of process the bearing ring is first cleaned and then a tin powder/flux slurry is applied to the inner surface of the ring, for example by spraying, whereafter the bearing ring is rotated about a horizontal axis at room temperature. The ring is then heated externally to the tinning temperature and transferred to a centrifugal casting machine whereupon a further flux/water mixture is sprayed in. With the ring still at the tinning temperature or above (i.e. with the ring still at or above the melting point of tin), the lining material, for example white metal is then introduced into the casting chamber and casting is effective with quenching of the ring by external spraying on of water taking place immediately after the commencement of casting. In this way a good bond can be achieved between the bearing ring and the lining material.

The invention further provides in a method of making a lined bearing which comprises applying a layer of bonding material to the radially inner surface of a bearing ring and casting on a layer of a lining material, the improvement which comprises applying bonding material powder to the radially inner surface of the bearing ring, heating the ring to at least a tinning temperature, applying a flux/water mixture to the hot bearing ring and without intermediate cooling, casting on the layer of lining material.

In order that the invention may be clearly understood and readily carried into effect a preferred form of apparatus suitable for carrying out the method of the invention and a preferred mode of operation will now be described, by way of example only, with reference to the accompanying diagrammatic drawings, wherein.

Figure 1:
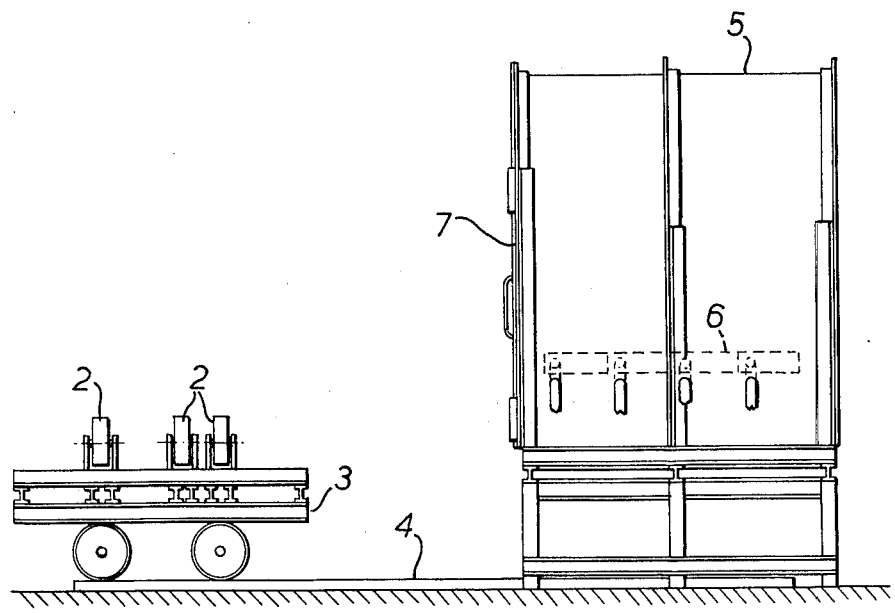
FIGS. 1 and 2 are respectively side and front views of a form of pre-heating apparatus.

Referring to the drawings, a bearing ring 1 is set up on rollers 2 mounted on a bogie 3. Bogie 3 can be run on rails 4 into and out of an oven 5 which is heated by gas burners 6. Oven 5 is provided with doors 7 and with a suitable observation window (not shown) by means of which the bearing ring 1 can be observed when it is in the oven. Rollers 2 can be rotated by means of a motor (not shown) mounted on bogie 3 to rotate the bearing ring 1 about a horizontal axis.

Figure 3:
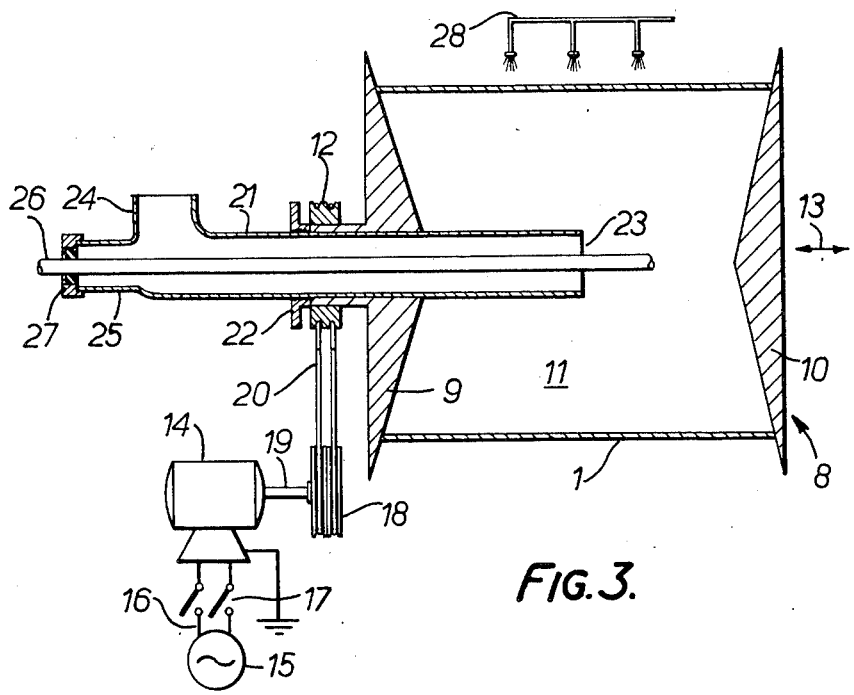
FIG. 3 is a cross-section through a form of centrifugal casting machine.

A centrifugal casting machine 8 which is illustrated in FIG. 3 is located conveniently in the vicinity of oven 5 so that a bearing ring 1 heated in oven 5 can be transferred to casting machine 8 without undue loss of heat. Casting machine 8 comprises a pair of cones 9 and 10 between which the ring 1 can be clamped for rotation about a horizontal axis. Ring 1 and cones 9 and 10 thereby together define a casting chamber 11. One of the cones, i.e. the cone 9 (the axially fixed cone) is provided with a pulley 12 by means of which it can be rotated in appropriate bearings (not shown) about an horizontal axis. The other cone 10, i.e. the withdrawable cone, is also rotatable about an horizontal axis coaxial with the axis of rotation of the cone 9 and is movable as indicated by the arrow 13 in the axial direction. Using this arrangement a wide range of diameters and axial lengths of bearing ring 1 can be accommodated in the centrifugal casting machine 8. Means (not shown) are provided for applying a clamping pressure between the two cones 9 and 10 in conventional manner, typically of the order of 3 tons, in order to clamp the ring 1 firmly in position during the centrifugal casting step.

A drive motor 14 connected to a suitable power supply 15 via cables 16 and double throw switch 17 is provided for driving the cone 9. Motor 14 carries a drive pulley 18 on its drive spindle 19 which drives drive pulley 12 by means of a belt 20.

A stationary feed pipe 21 extends through a rotary gland 22 through the centre of drive pulley 12 and terminates at its inner end 23 within the casting chamber 11. The other end 24 is bent upwardly approximately through 90° to provide a passage through which a molten lining material such as white metal (babbit metal) can be introduced into the casting chamber 11.

Feed pipe 21 is provided with a branch 25 whose axis is coaxial with the axis of rotation of the bearing ring 1. A further pipe 26 extends through the branch 25 and is sealed thereto by means of a gland 27. An aqueous flux solution can be introduced through the pipe 26 into the casting chamber 11. Gland 27 permits withdrawal of pipe 26 (in a leftward direction as shown in the drawing) when it is desired to introduce molten bearing material through the pipe 21.

A series of water cooling sprays 28 are provided above the bearing ring 1 for quenching the bearing.

The cones 9 and 10 are desirably covered with a plasma layer of alumina ($Al_2O_3$) or titanium or some other tin repellent material.

Figure 2:
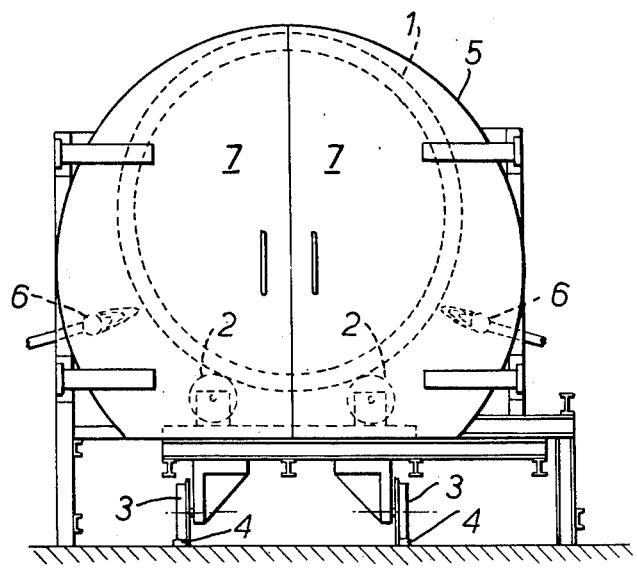

A steel bearing ring 1 having an outside diameter of 700 mm, an internal diameter of 640 mm and a length of 500 mm was cleaned by degreasing and pickling and scouring and then set up on the rollers 2 of the heating bogie 3 of the apparatus of FIGS. 1 and 2. A mixture was prepared of 99.9% pure tin powder having a particle size in the range of from 1 to 40 microns with zinc chloride and water. Sufficient zinc chloride was dissolved in water to give a solution having a specific gravity of about 2 and this was then mixed with the tin powder in the proportions of approximately 100 parts by weight of tin powder to 120 parts by weight of zinc chloride to give a slurry which could be painted on the radially inner surface of the bearing ring. I have found that best results are obtained using as pure a grade of zinc chloride as possible, for example an analytical grade rather than a technical grade. This flux/tin powder slurry was then applied to the radially inner surface of the bearing ring 1 whilst rotating the ring slowly on the rollers 2. (The quantity of tin powder/flux mixture is not critical but is preferably sufficient to provide an amount of tin of the order of at least about 1.5 grams per square decimeter of surface corresponding to a coating thickness of at least about 20 m$\mu$).

The bogie 3 was then run into the oven 5 and doors 7 were shut and the ring 1 was heated whilst rotating the rollers 2 and observing the inner surface of the ring 1. During initial heating of the ring 1 the flux dried off and in due course the tin melted. At about 250° C there was a colour change indicating a metallurgical reaction. Heating was continued further to raise the temperature of the bearing to approximately 300° C.

The bogie 3 was then run out of the oven 5 and the hot bearing ring 1 was then transferred as quickly as possible to the centrifugal casting machine 8 and rotation commenced. An additional quantity of zinc chloride solution was then sprayed in through pipe 26 resulting in the sudden formation of steam, a fine distribution of flux and the production of a water vapour-containing atmosphere within the casting chamber 11. Any metal oxides such as tin oxide which formed during application of the tin layer in the apparatus of FIGS. 1 and 2 or during transfer to the casting machine of FIG. 3 were reduced in this atmosphere. The flux also re-activated any flux remnants still present and liquidised them. The presence of flux during the lining process was no cause for alarm since the flux was dragged away to the centre of rotation during the centrifugal casting process. After the coated bearing had cooled down the flux could easily be washed off the surface. Pipe 26 was then withdrawn and when the ring 1 was spinning at the desired speed molten white metal was poured in through the pipe 21. As soon as the pouring of the white metal commenced the ring 1 was cooled as fast as possible by spraying with water from the nozzle 28.

In this process the ring should be transferred from the bogie 3 of FIGS. 1 and 2 to the centrifugal casting machine 8 of FIG. 3 as fast as possible so that when the pouring of white metal commences the temperature of the ring 1 has not fallen below the melting point of tin (232° C).

Figure 4:
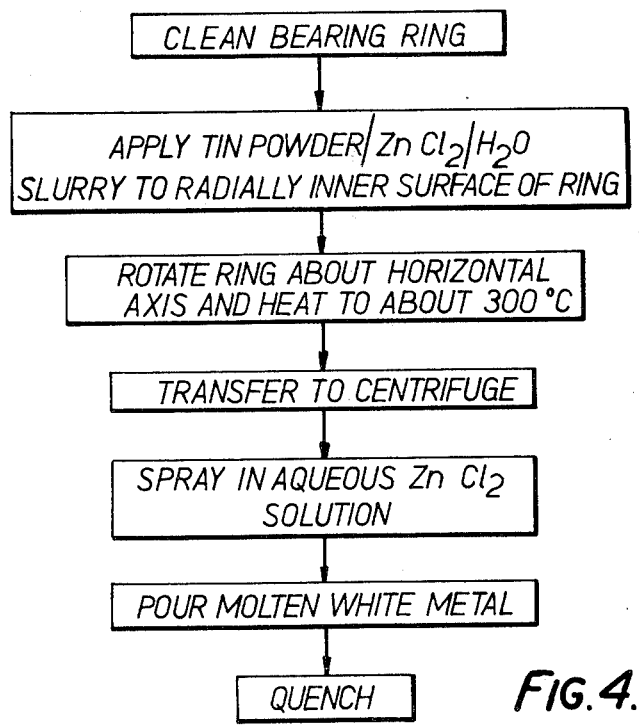
FIG. 4 shows a flow diagram of a preferred method of lining a bearing according to the invention.

FIG. 4 sets out diagrammatically the process steps involved in the above described procedure.

The lining made in this amnner was then machine to the desired dimensions in the usual way and it was found that the lining was firmly bonded to the ring 1. Repetition of this process on further bearing rings of a variety of sizes gave equally good results with a much lower than usual rate of rejection of bearings. Using conventional methods involving dipping in a molten tin bath and wiping off the tin oxide layer formed, a proportion of bearings must in practice be rejected because of inadequate bond strength between the lining and the bearing ring. However, using the above described process essentially all bearings were satisfactory for use including grooved bearings.

It will be appreciated by those skilled in the art that the above described process obviates the use of massive molten tin baths and results in a considerable capital saving as well as doing away with the necessity for periodic purification of the tin bath. Furthermore the wiping step to remove any tin oxide formed on the surface of a dipped tin coating is rendered unnecessary and permits the reliable manufacture of lined grooved bearings. By applying a known amount of tin powder the thickness of the layer of tin can be controlled to a desired figure. The process described is also economical in its use of tin.

Although the illustrated process and apparatus requires a transfer step for the ring 1 from the rollers 2 to the casting machine 8 it is also possible to carry out the process without this step in a centrifugal casting machine provided with suitable observation facilities and with means for heating the bearing ring 1 to the desired temperature.

If desired the oven 5 can be heated by means other than the gas burners 6, for example by means of a hot air stream ducted into the oven.

I claim:

1. In a method of making a lined bearing which comprises applying a layer of metallic bonding material selected from tin and tin alloys to the radially inner surface of a bearing ring and centrifugally casting on a layer of a lining material, the improvement which comprises supplying the bonding material in the form of a powder as a slurry with water and a flux at the radially inner surface of the bearing ring, heating the ring to at least a tinning temperature, being a temperature sufficient to cause conversion of water to steam, applying a flux/water mixture to the thus applied layer of bonding material on the radially inner surface of the hot bearing ring and, without intermediate cooling, centrifugally casting on the layer of lining material.

2. A method of making a lined bearing which comprises the steps of applying a layer of a metallic bonding material to at least the radially inner surface of a bearing ring, heating the thus-treated bearing ring to a temperature at least as high as the melting point of the bonding material, said temperature being sufficient to cause vaporization of water to steam, thereafter projecting water and flux, the flux being in the form of a solution, onto the hot radially inner surface of the bearing ring, thereby to cause sudden formation of steam, to cause a fine distribution of the flux, and to establish reducing conditions over the applied layer of bonding material, so that any metal oxides formed during application of said bonding material are reduced, and then centrifugally casting a layer of lining material over said layer of bonding material, said centrifugal casting step being carried out in the presence of the flux and while said reducing conditions are maintained.

3. A method according to claim 2 in which the bearing ring is heated to a temperature of from about 280° to about 300° C prior to casting on the layer of lining material.

4. A method according to claim 2, in which application of the layer of bonding material and casting on of the lining material are effected in the same centrifugal casting machine.

5. A method according to claim 2, including the step of spraying water on the radially external surface of the ring immediately after commencing the casting of lining material in order to quench the ring.

6. A method according to claim 2, in which the flux is a halogen-containing flux.

7. A method according to claim 6, in which the flux is a chlorine-containing flux.

8. A method according to claim 6, in which the flux is selected from zinc chloride, stannous chloride, stannic chloride lead chloride, antimony trichloride, antimony oxychlorides, ammonium chloride and mixtures of two or more thereof.

9. The method claimed in claim 2 in which said bonding material is applied to said surface in the form of a powder as a slurry with water, which slurry further contains a flux, and said ring is heated, at least to the melting point of the bonding material, while being constantly rotated about a substantially horizontal axis to distribute the bonding material uniformly over the radially inner surfaces of the ring before said liner material is centrifugally cast.

10. The method claimed in claim 9 in which the casting of said lining material is initiated immediately after the distribution of said bonding material without any intermediate cooling step.

11. A method according to claim 2, in which said flux is zinc chloride and is sprayed onto the hot radially inner surface of the bearing ring as a solution in water having a specific gravity of about 2.

12. A method according to claim 2, in which the metallic bonding material is selected from tin and tin alloys.

13. A method according to claim 9, in which the flux of said slurry is selected from zinc chloride, stannous chloride, stannic chloride, lead chloride, antimony trichloride, antimony oxychlorides, ammonium chloride and mixtures of two or more thereof.

14. In a method of making a lined bearing which comprises applying a layer of bonding material to at least the radially inner surface of a bearing ring and centrifugally casting a layer of lining material over said layer of bonding material, the improvement which comprises providing at the radially inner surface of the bearing ring a slurry comprising a bonding material selected from tin and tin alloys in the form of a powder, water and a flux, and heating the ring at least to the melting point of the bonding material while rotating the bearing ring about a substantially horizontal axis whereby the bonding material is essentially uniformly distributed over the radially inner surface of the ring.

15. A method according to claim 14 in which the slurry further contains fine metal particles which do not dissolve in the molten bonding material and have a specific gravity greater than that of the molten bonding material, said particles being forced toward the surface of the ring during centrifugal casting of the lining material onto the bonding material.

16. A method according to claim 15, in which the particles are present in an amount of up to 3% by weight of the bonding material.

17. A method according to claim 15, in which the particles are particles of carbonyl nickel.

18. A method according to claim 14 further comprising applying to the bearing ring, metal articles which do not melt under the conditions employed, and removing said metal articles from the molten bonding material prior to casting a bearing lining material onto the bonding material.

19. A method according to claim 18, in which the metal articles comprises iron articles having a maximum dimension of from about 2 mm to about 10 mm.

20. The improved method of claim 14, wherein the slurry comprises bonding material powder dispersed in a flux solution having a concentration of about 1.8 to 1.9 grams flux per cubic centimeter, said flux being selected from zinc, chloride, stannous chloride, stannic chloride, lead chloride, antimony trichloride, antimony oxychlorides, ammonium chloride and mixtures of two or more thereof.

21. The improved method of claim 14 in which the flux is a halogen-containing flux.

22. The improved method of claim 14, wherein the bonding material powder is selected from tin powder and tin alloy powders.

23. A method of making a lined bearing which comprises the steps of applying to at least the radially inner surface of a bearing ring a slurry of powdered metallic bonding material, water and a flux, heating the thus treated ring and the bonding material thereon at least to the melting point of the bonding material so as to form a layer of bonding material on the radially inner surface of the bearing ring, establishing a steam-containing reducing atmosphere over the applied layer of bonding material which atmosphere reduces any metal oxides formed during application of said bonding material, and centrifugally casting a layer of lining material over said layer of bonding material, said centrifugal casting step being carried out in the presence of a flux and while said atmosphere is being maintained.

* * * * *